(12) United States Patent
Yang et al.

(10) Patent No.: US 9,856,804 B2
(45) Date of Patent: Jan. 2, 2018

(54) SYSTEMS AND METHODS FOR INFERRING FUEL VAPOR CANISTER LOADING RATE

(71) Applicant: Ford Global Technologies, LLC, Dearborn, MI (US)

(72) Inventors: Dennis Seung-Man Yang, Canton, MI (US); Aed M. Dudar, Canton, MI (US); Russell Randall Pearce, Ann Arbor, MI (US); Rob Ognjanovski, Jr., Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 14/726,033

(22) Filed: May 29, 2015

(65) Prior Publication Data

US 2016/0215714 A1  Jul. 28, 2016

Related U.S. Application Data

(63) Continuation-in-part of application No. 14/606,704, filed on Jan. 27, 2015, now Pat. No. 9,745,907.

(51) Int. Cl.
| | |
|---|---|
| *F02D 41/00* | (2006.01) |
| *F02D 41/22* | (2006.01) |
| *F02M 25/08* | (2006.01) |
| *G01F 22/02* | (2006.01) |
| *F02D 41/14* | (2006.01) |

(52) U.S. Cl.
CPC ......... *F02D 41/0045* (2013.01); *F02D 41/22* (2013.01); *F02M 25/0809* (2013.01); *F02M 25/089* (2013.01); *F02M 25/0836* (2013.01); *G01F 22/02* (2013.01); *F02D 41/1459* (2013.01); *F02D 2041/224* (2013.01); *F02D 2200/0602* (2013.01); *Y02T 10/40* (2013.01)

(58) Field of Classification Search
CPC . F02D 41/0032; F02D 41/0045; F02D 41/004
USPC ........................................ 141/7, 59; 123/520
See application file for complete search history.

(56) References Cited

U.S. PATENT DOCUMENTS

| | | | |
|---|---|---|---|
| 4,887,578 A * | 12/1989 | Woodcock ....... | B60K 15/03504 123/516 |
| 5,205,263 A | 4/1993 | Blumenstock et al. | |
| 6,170,538 B1 | 1/2001 | Devall | |
| 6,907,780 B1 | 6/2005 | Meagher | |

(Continued)

OTHER PUBLICATIONS

Dudar, Aed M., "System and Methods for Fuel Level Inference," U.S. Appl. No. 14/226,498, filed Mar. 26, 2014, 35 pages.

(Continued)

*Primary Examiner* — Timothy L Maust
*Assistant Examiner* — Timothy P Kelly
(74) *Attorney, Agent, or Firm* — James Dottavio; McCoy Russell LLP

(57) ABSTRACT

A method is provided, comprising indicating a fuel vapor canister load based on a steady-state fuel vapor circulation rate in a vapor recovery line during a refueling event; and adjusting a canister purging operation in response to the indicated fuel vapor canister load. Restrictions in the vapor recovery line may increase the rate of fuel vapor canister loading during a refueling event. In this way, an accurate canister load may be determined following a refueling event, and canister purging operations adjusted accordingly.

20 Claims, 6 Drawing Sheets

(56) References Cited

U.S. PATENT DOCUMENTS

| | | |
|---|---|---|
| 7,296,600 B2 | 11/2007 | Ferreria et al. |
| 7,717,095 B2 * | 5/2010 | Liu ..................... F02D 41/0032 123/520 |
| 7,823,610 B2 | 11/2010 | King |
| 2016/0215713 A1 * | 7/2016 | Dudar ................. F02D 41/0032 |
| 2016/0215715 A1 * | 7/2016 | Dudar ................. F02D 41/0045 |

OTHER PUBLICATIONS

Dudar, Aed M. et al., "System and Methods for Determining Fuel Fill Level," U.S. Appl. No. 14/490,220, filed Sep. 18, 2014, 47 pages.

\* cited by examiner

SYSTEMS AND METHODS FOR INFERRING FUEL VAPOR CANISTER LOADING RATE

CROSS REFERENCE TO RELATED APPLICATIONS

The present application is a continuation-in-part of U.S. patent application Ser. No. 14/606,704, "Systems and Methods for Inferring Fuel Vapor Canister Loading Rate," filed on Jan. 27, 2015, the entire contents of which are incorporated herein by reference for all purposes.

BACKGROUND AND SUMMARY

Vehicle emission control systems may be configured to store fuel vapors from fuel tank refueling and diurnal engine operations, and then purge the stored vapors during a subsequent engine operation. The fuel vapors may be stored in a fuel vapor canister coupled to the fuel tank which contains adsorbent material, such as activated carbon, capable of adsorbing hydrocarbon fuel vapor.

The fuel tank may be further coupled to a vapor recovery line (vapor recirculation line) which may also be coupled to the fuel vapor canister and the fuel filler neck. The vapor recovery line may be configured to circulate and/or hold a percentage of refueling vapors, thus limiting the rate of fuel vapor canister loading. Further, depending on the fuel dispenser, the fuel vapors within the vapor recovery line may be returned to the fuel dispenser, thus limiting the total fuel vapor stored within the fuel vapor canister for a given refueling event.

However, if the vapor recovery line becomes blocked, fuel vapor will not circulate through the vapor recovery line, and the canister loading rate (and total load) will increase. Unlike other blockages in the emissions control system, a blockage in the vapor recovery line may not necessarily result in pre-mature shutoff of the fuel dispenser, and may thus go undiagnosed. This may lead to an underestimation of canister load following refueling, which may in turn lead to an increase in bleed emissions if canister purge operations are not updated to accurately reflect the current canister load. While the fuel tank pressure during the refueling event can also be used to estimate the canister loading rate, the fuel tank pressure may not increase in accordance with a vapor recovery line blockage, and may thus not provide an accurate reflection of canister loading in the case of degradation.

The inventors herein have recognized the above issues, and have developed systems and methods to at least partially address them. In one example, a method is provided, comprising indicating a fuel vapor canister load based on a steady-state fuel vapor circulation rate in a vapor recovery line during a refueling event; and adjusting a canister purging operation in response to the indicated fuel vapor canister load. Restrictions in the vapor recovery line may increase the rate of fuel vapor canister loading during a refueling event, as less fuel vapor is recirculated through the vapor recovery line, and more is directed towards the fuel vapor canister. The fuel vapor circulation rate in the vapor recovery line may thus be used to indicate restrictions and thus indicate a rate of canister loading during the refueling event. In this way, an accurate canister load may be determined following the refueling event, and canister purging operations adjusted accordingly.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 1:
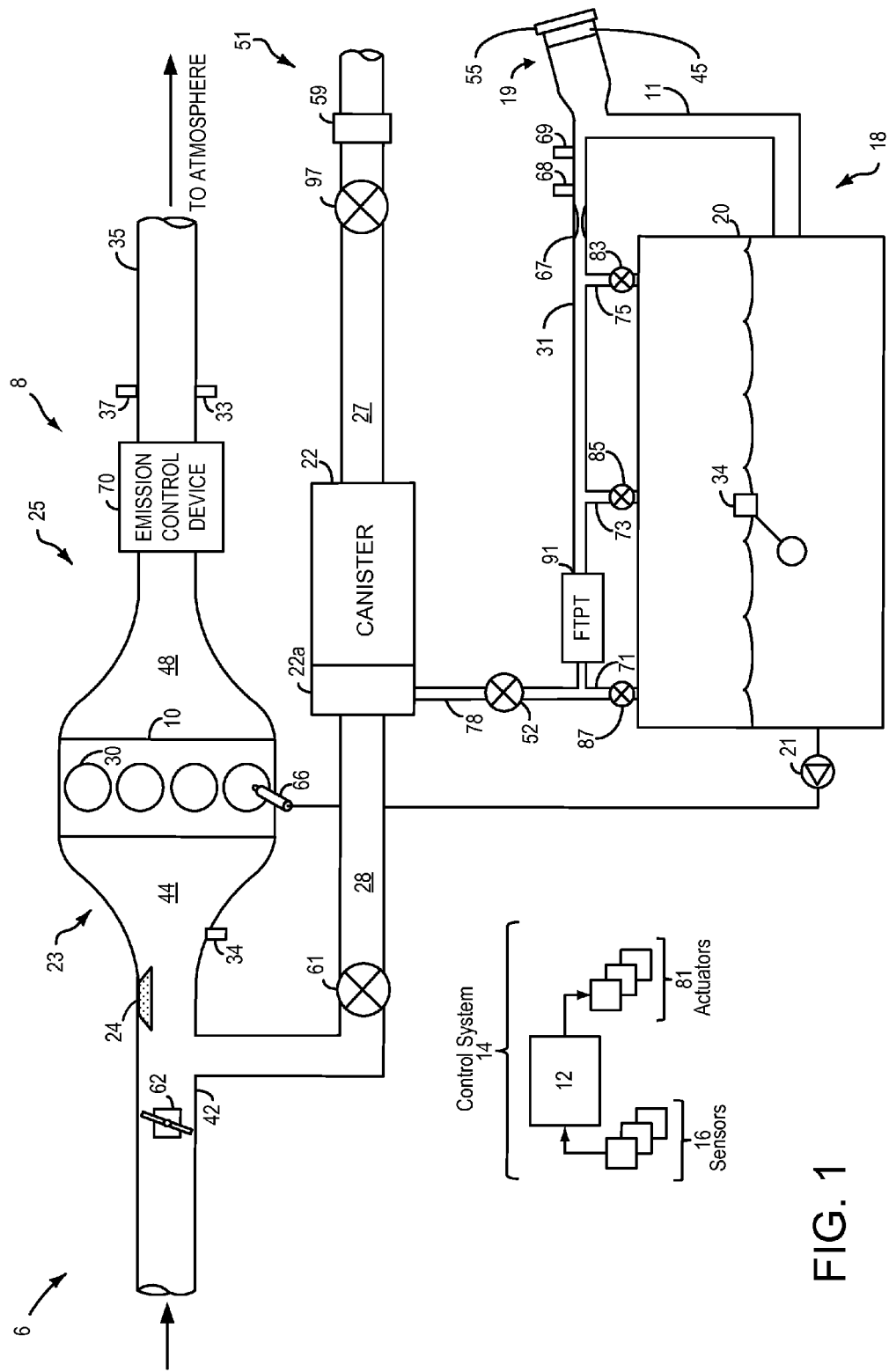
FIG. 1 shows a schematic depiction of a fuel system coupled to an engine system.
Figure 3:
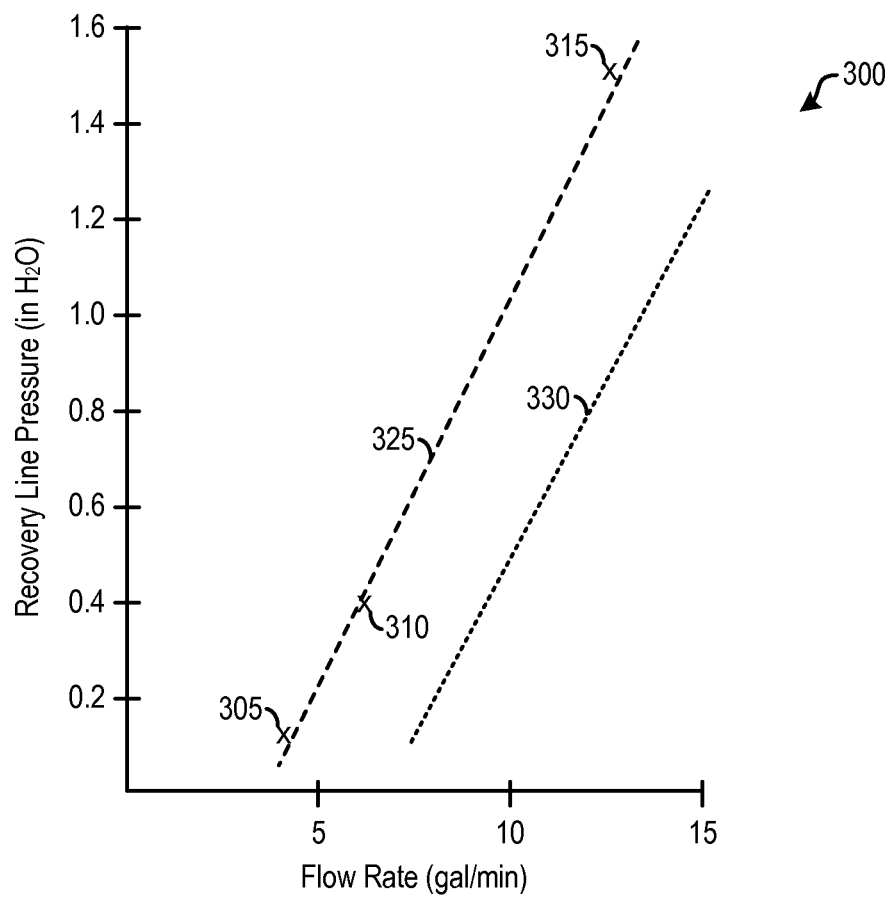
FIG. 3 shows a regression analysis plotting steady-state recovery line pressure against fuel dispensation rate.
Figure 4:
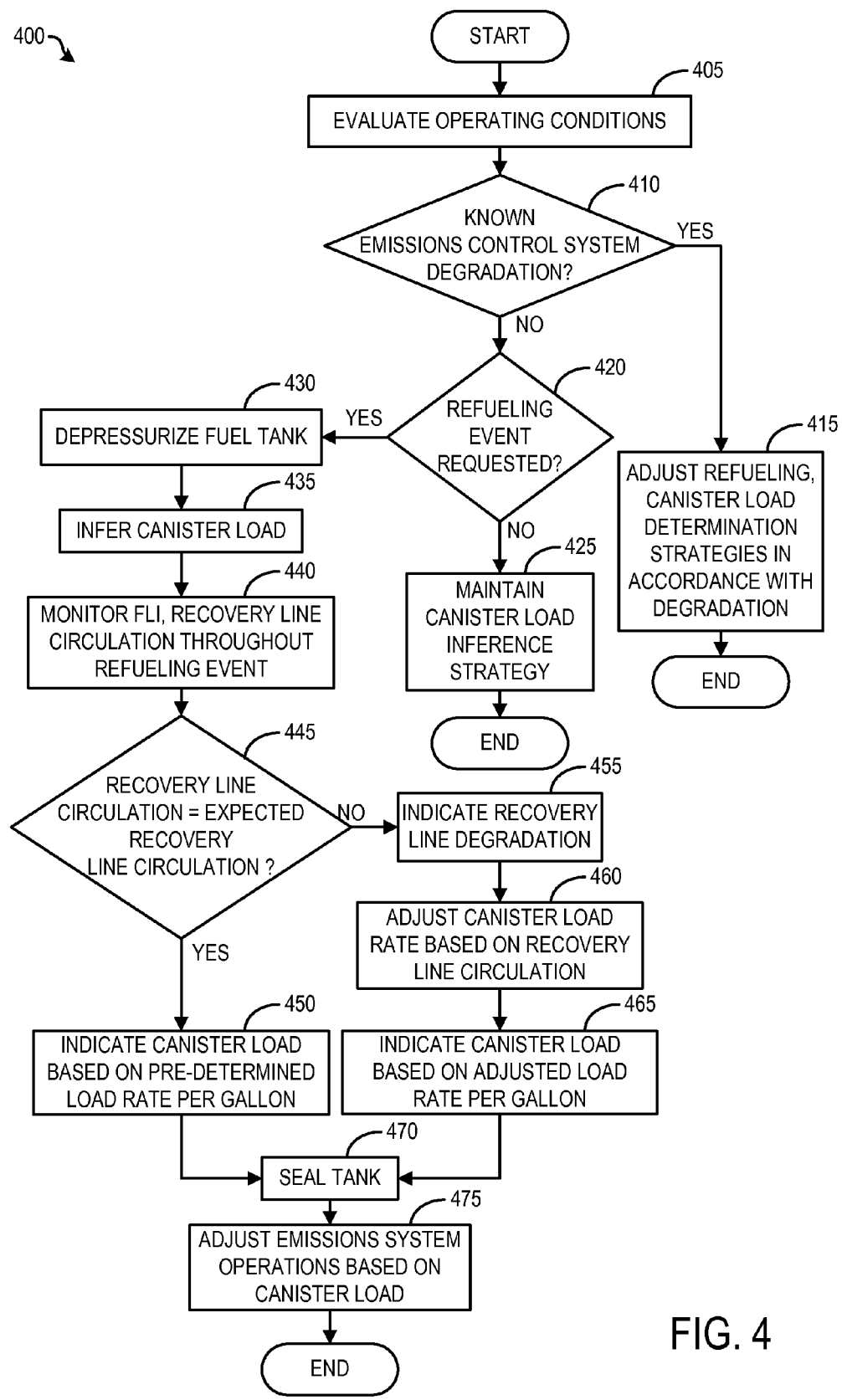
FIG. 4 shows an example method for determining a fuel vapor canister loading rate during a refueling event.
Figure 5:
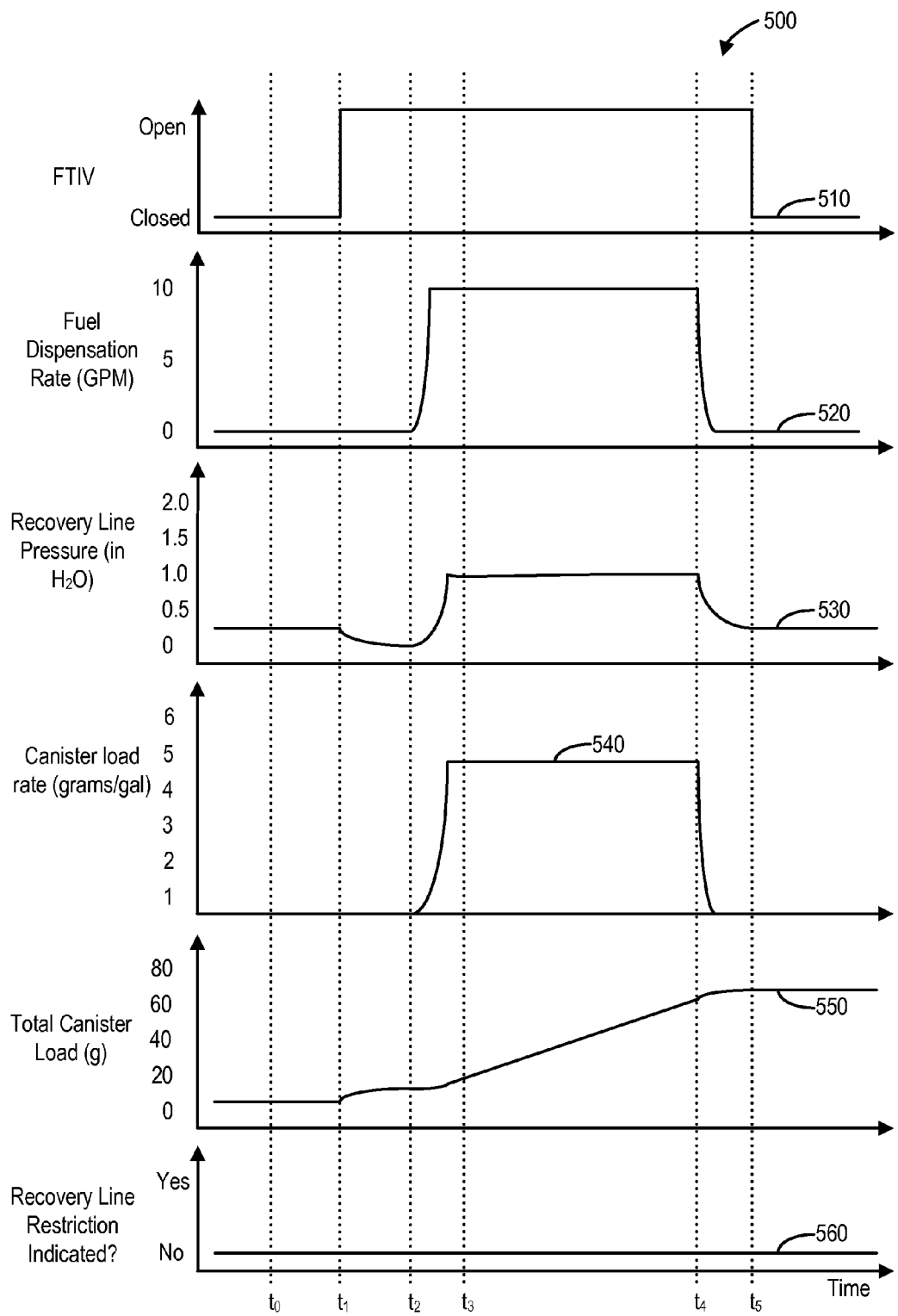
FIG. 5 shows an example timeline for a refueling event including an intact fuel vapor recovery line.
Figure 6:
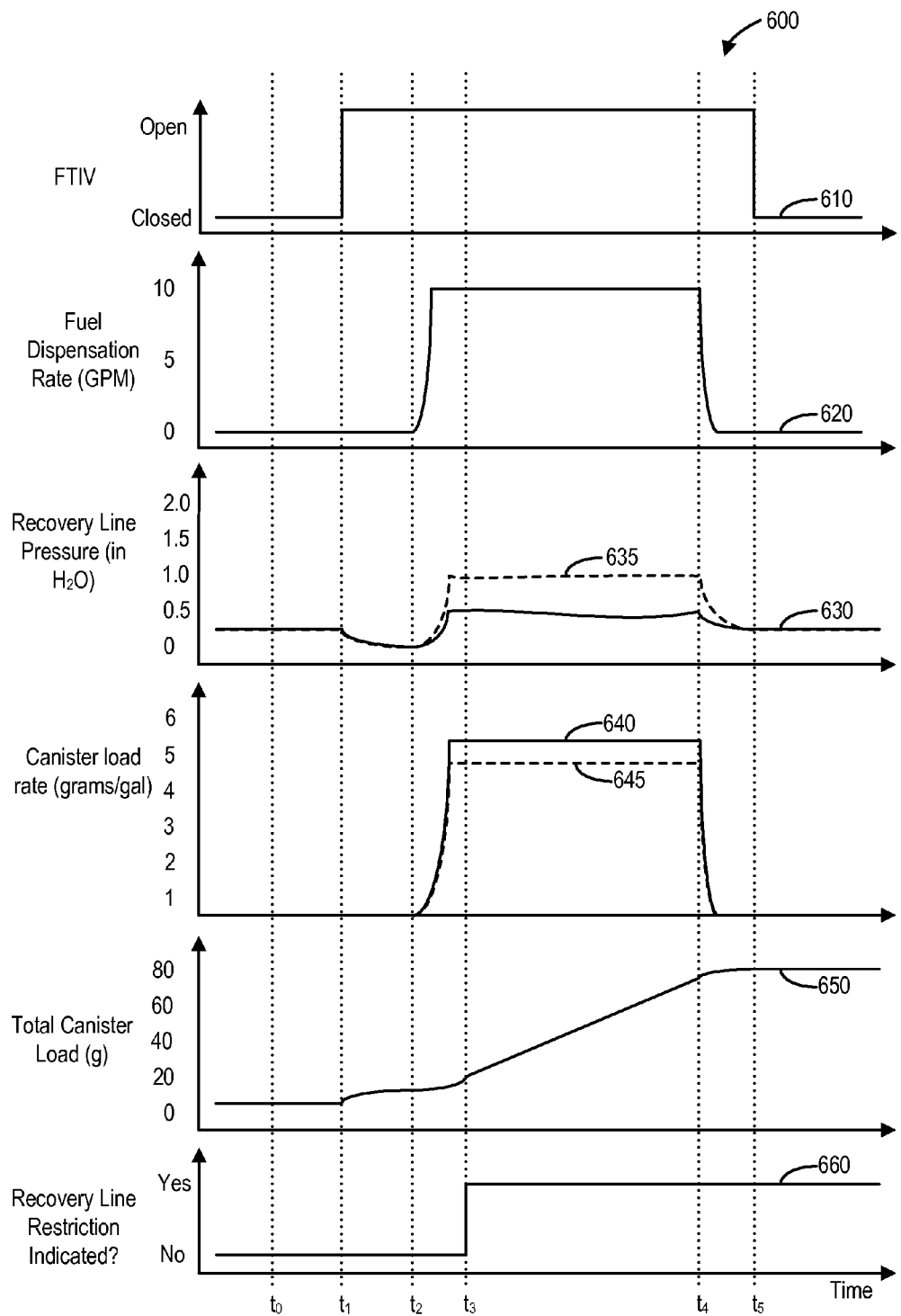
FIG. 6 shows an example timeline for a refueling event including a blocked fuel vapor recovery line.

This detailed description relates to systems and methods for inferring a fuel vapor canister load. In particular, the fuel vapor canister load may be inferred based on the steady-state fuel vapor circulation rate in a vapor recovery line during a refueling event. The fuel vapor canister may be included in a hybrid vehicle, such as a plug-in electric hybrid vehicle, as depicted in FIG. 1. The vapor recovery line may comprise a pressure sensor and/or a hydrocarbon sensor to determine the fuel vapor circulation rate. During a refueling event, the steady-state pressure in the vapor recovery line increases proportionately with the fuel dispensing rate, as shown in FIGS. 2A, 2B, 2C, and 3. However, if a blockage exists within the vapor recovery line, the vapor recovery line pressure may be less than expected based on the fuel dispensing rate, as shown in FIG. 3. This relationship may be exploited to determine vapor recovery line degradation, as well as a fuel canister load rate during a refueling event. FIG. 4 shows an example method for determining fuel canister load rate during a refueling event. FIG. 5 shows an example timeline for a refueling event including an intact fuel vapor recovery line using the method of FIG. 4 applied to the system of FIG. 1. FIG. 6 shows an example timeline for a refueling event including a blocked fuel vapor recovery line using the method of FIG. 4 applied to the system of FIG. 1.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 24 may be placed in the intake manifold of engine 10 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 24. In addition, fuel vapors stored during an engine shutdown can also be desorbed from the AIS HC during engine operation. In this way, AIS HC 24 may be continually loaded and purged, and the trap may reduce evaporative emissions from the intake passage even when engine 10 is shut down.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Vapors generated in fuel system 18 may be routed to an evaporative emissions control system 51 which includes a fuel vapor canister 22 via vapor recovery line 31, before being purged to the engine intake 23. Vapor recovery line 31 may be coupled to fuel tank 20 via one or more conduits and may include one or more valves for isolating the fuel tank during certain conditions. For example, vapor recovery line 31 may be coupled to fuel tank 20 via one or more or a combination of conduits 71, 73, and 75. The vapor recovery line may be configured to hold a percentage of total fuel vapor generated during a refueling event. For example, the vapor recovery line may be configured to hold 20% of the total fuel vapor generated. By effectively increasing the vapor dome volume of the fuel tank, the recovery line may limit the rate of flow of fuel vapor to the fuel vapor canister. Depending on the configuration of the fuel dispenser, a portion of the fuel vapor held within the recovery line may be returned to the fuel dispenser.

Further, in some examples, one or more fuel tank vent valves may be deposed in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include a grade vent valve (GVV) 83. Further, in some examples, recovery line 31 may be coupled to a fuel filler system 19. In some examples, fuel filler system 19 may include a fuel cap 5 for sealing off the fuel filler system from the atmosphere. Fuel filler system 19 is coupled to fuel tank 20 via a fuel filler pipe or neck 11.

Vapor recovery line 31 may include one or more orifices 67. For example, each orifice may be on the order of 2-3.5 mm in diameter, but may be smaller or larger in diameter in some examples. Each orifice may have an equal diameter, or the diameters may vary across orifices. Vapor recovery line 31 may further include one or more vapor recovery line pressure sensors 68, and one or more vapor recovery line hydrocarbon sensors. The sensors may be utilized to compare fuel vapor circulation through the vapor recovery line during refueling events. As will be described further herein, restrictions in the vapor recovery line may result in decreased fuel vapor circulation, which may result in reduced pressure and hydrocarbon concentration in the vapor recovery line during refueling events.

Fuel filler system 19 may include refueling lock 45. In some embodiments, refueling lock 45 may be a fuel cap locking mechanism. The fuel cap locking mechanism may be configured to automatically lock the fuel cap in a closed position so that the fuel cap cannot be opened. For example, the fuel cap 55 may remain locked via refueling lock 45 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 45 may be a filler pipe valve located at a mouth of fuel filler pipe 11. In such embodiments, refueling lock 45 may not prevent the removal of fuel cap 55. Rather, refueling lock 45 may prevent the insertion of a refueling pump into fuel filler pipe 11. The filler pipe valve may be electrically locked, for example by a solenoid, or mechanically locked, for example by a pressure diaphragm.

In some embodiments, refueling lock 45 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

Emissions control system 51 may include one or more emissions control devices, such as one or more fuel vapor canisters 22 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include a canister ventilation path or vent line 27 which may route gases out of the canister 22 to the atmosphere when storing, or trapping, fuel vapors from fuel system 18.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Vent line 27 may also allow fresh air to be drawn into canister 22 when purging stored fuel vapors from fuel system 18 to engine intake 23 via purge line 28 and purge valve 61. For example, purge valve 61 may be normally closed but may be opened during certain conditions so that vacuum from engine intake manifold 44 is provided to the fuel vapor canister for purging. In some examples, vent line 27 may include an air filter 59 disposed therein upstream of a canister 22.

In some examples, the flow of air and vapors between canister 22 and the atmosphere may be regulated by a canister vent valve coupled within vent line 27. When included, the canister vent valve may be a normally open valve, so that fuel tank isolation valve 52 (FTIV) may control venting of fuel tank 20 with the atmosphere. FTIV 52 may be positioned between the fuel tank and the fuel vapor canister within conduit 78. FTIV 52 may be a normally closed valve, that when opened, allows for the venting of fuel vapors from fuel tank 20 to canister 22. Fuel vapors may then be vented to atmosphere, or purged to engine intake system 23 via canister purge valve 61.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 52 while closing canister purge valve (CPV) 61 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 52, while maintaining canister purge valve 61 closed, to depressurize the fuel tank before allowing enabling fuel to be added therein. As such, isolation valve 52 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 61 while closing isolation valve 52. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include universal exhaust gas oxygen (UEGO) sensor 37 located upstream of the emission control device, temperature sensor 33, pressure sensor 91, and canister temperature sensor 43. Other sensors such as pressure, temperature, air/fuel ratio, and composition sensors may be coupled to various locations in the vehicle system 6. As another example, the actuators may include fuel injector 66, throttle 62, fuel tank isolation valve 53, pump 92, and refueling lock 45. The control system 14 may include a controller 12. The controller may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller may receive input data from the various sensors, process the input data, and trigger the actuators in response to the processed input data based on instruction or code programmed therein corresponding to one or more routines. An example control routine is described herein and with regard to FIG. 4.

In some configurations, a canister vent valve (CVV) 97 may be coupled within vent line 27. CVV 97 may function to adjust a flow of air and vapors between canister 22 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 97 may be a solenoid valve wherein opening or closing of the valve is performed via actuation of a canister vent solenoid. In particular, the canister vent valve may be an open that is closed upon actuation of the canister vent solenoid. In some examples, CVV 97 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

During a refueling event, refueling vapors will be generated and diverted to the fuel vapor canister, where they will be adsorbed. As fuel is added to the fuel tank, both the fuel tank and vapor recovery line will experience an increase in vapor pressure and hydrocarbon concentration as fuel vapor is generated. At a threshold vapor pressure the fuel dispenser is automatically shut-off. In some examples, a float valve is coupled within the fuel tank which automatically closes one or more valves upon reaching a pre-determined fuel level. In this way, the fuel vapor pressure increases rapidly as the tank fills, thus shutting the dispenser off and preventing overfilling of the fuel tank. If the refueling dispenser is configured to dispense fuel at a constant rate, both the fuel tank and fuel vapor recovery line will experience a steady-state pressure and hydrocarbon concentration that is proportionate to the rate of fuel dispensation.

Figure 2A:
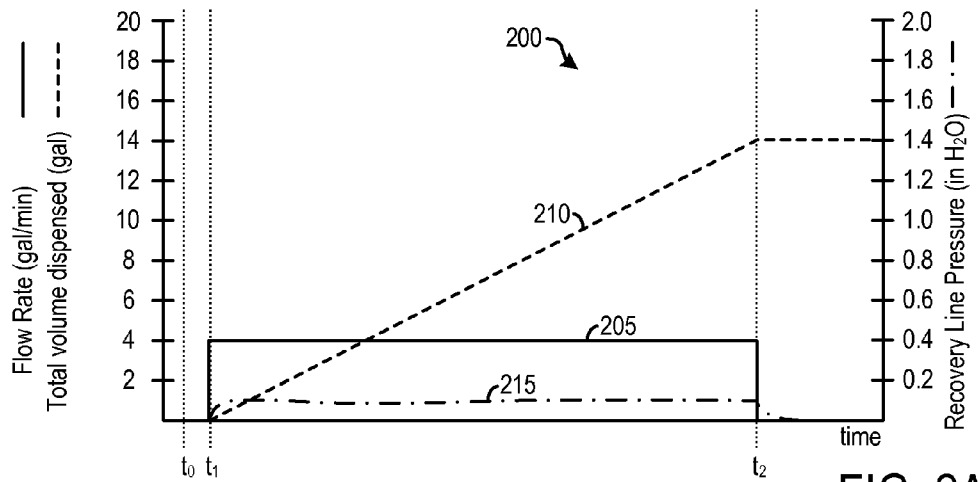
FIG. 2A shows an example timeline for a refueling event including a fuel dispensing rate of 4 gal/min.
Figure 2B:
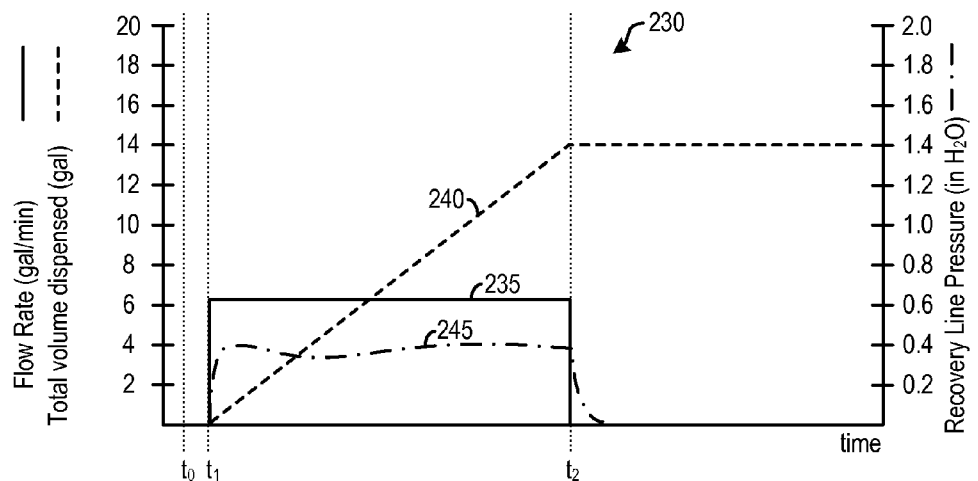
FIG. 2B shows an example timeline for a refueling event including a fuel dispensing rate of 6 gal/min.
Figure 2C:
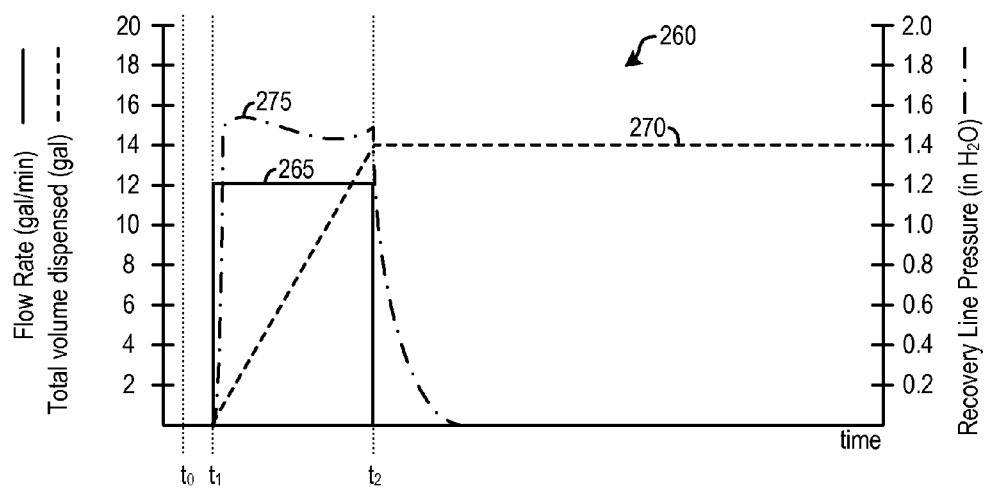
FIG. 2C shows an example timeline for a refueling event including a fuel dispensing rate of 12 gal/min.

FIGS. 2A-2C show example timelines for refueling events in accordance with the current disclosure. FIG. 2A depicts example timeline 200. Timeline 200 includes plot 205, depicting the flow rate of a liquid fuel (in gallons/min) from a fuel dispenser into a fuel tank over time. Timeline 200 further includes plot 210, showing the total volume of fuel dispensed (in gallons) into the fuel tank over time. Timeline 200 further includes plot 215, depicting vapor recovery line pressure (in in $H_2O$) over time. Gradations for flow rate and total volume of fuel dispensed are presented on the left-hand side of timeline 200, while gradations for vapor recovery line pressure are presented on the right-hand side of timeline 200.

At time $t_0$, the fuel system is in a steady state, awaiting the initiation of a refueling event. Accordingly, the vapor recovery line pressure is approximately atmospheric pressure. At time $t_1$, a refueling event begins. The fuel dispenser in this example dispenses liquid fuel at a rate of 4 gallons/min, as shown by plot 205. The total fuel dispensed into the fuel tank increases accordingly, as shown by plot 210. As shown by plot 215, the vapor recovery line pressure during the refueling event (as determined through a vapor recovery line pressure transducer) is approximately 0.12 in $H_2O$ during the steady-state period shortly following time $t_1$ through time $t_2$. At time $t_2$, the dispensation of fuel ceases, as shown by plot 210. The vapor recovery line pressure decreases, as fuel vapor diffuses to the fuel vapor canister. The refueling event then ends.

FIG. 2B depicts example timeline 230. Timeline 230 includes plot 235, depicting the flow rate of a liquid fuel (in gallons/min) from a fuel dispenser into a fuel tank over time. Timeline 230 further includes plot 240, showing the total volume of fuel dispensed (in gallons) into the fuel tank over time. Timeline 230 further includes plot 245, depicting vapor recovery line pressure (in in $H_2O$) over time. Gradations for flow rate and total volume of fuel dispensed are presented on the left-hand side of timeline 230, while gradations for recovery line pressure are presented on the right-hand side of timeline 230. Operating conditions for timeline 230 are equivalent to those for timeline 200, excepting for fuel dispensation rate.

At time $t_0$, the fuel system is in a steady state, awaiting the initiation of a refueling event. Accordingly, the vapor recovery line pressure is approximately atmospheric pressure. At time $t_1$, a refueling event begins. The fuel dispenser in this example dispenses liquid fuel at a rate of 6 gallons/min, as shown by plot 235. The total fuel dispensed into the fuel tank increases accordingly, as shown by plot 240. As shown by plot 245, the vapor recovery line pressure during the refueling event (as determined through a vapor recovery line pressure transducer) is approximately 0.4 in $H_2O$ during the steady-state period shortly following time $t_1$ through time $t_2$. At time $t_2$, the dispensation of fuel ceases, as shown by plot 240. The vapor recovery line pressure decreases, as fuel vapor diffuses to the fuel vapor canister. The refueling event then ends.

FIG. 2C depicts example timeline 260. Timeline 260 includes plot 265, depicting the flow rate of a liquid fuel (in gallons/min) from a fuel dispenser into a fuel tank over time. Timeline 260 further includes plot 270, showing the total volume of fuel dispensed (in gallons) into the fuel tank over time. Timeline 260 further includes plot 275, depicting vapor recovery line pressure (in in $H_2O$) over time. Gradations for flow rate and total volume of fuel dispensed are presented on the left-hand side of timeline 260, while gradations for recovery line pressure are presented on the right-hand side of timeline 260. Operating conditions for timeline 260 are equivalent to those for timelines 200 and 230, excepting for fuel dispensation rate.

At time $t_0$, the fuel system is in a steady state, awaiting the initiation of a refueling event. Accordingly, the vapor recovery line pressure is approximately atmospheric pressure. At time $t_1$, a refueling event begins. The fuel dispenser in this example dispenses liquid fuel at a rate of 12 gallons/min, as shown by plot 265. The total fuel dispensed into the fuel tank increases accordingly, as shown by plot 270. As shown by plot 275, the vapor recovery line pressure during the refueling event (as determined through a vapor recovery line pressure transducer) is approximately 1.5 in $H_2O$ during the steady-state period shortly following time $t_1$ through time $t_2$. At time $t_2$, the dispensation of fuel ceases, as shown by plot 270. The vapor recovery line pressure decreases, as fuel vapor diffuses to the fuel vapor canister. The refueling event then ends.

For a particular fuel system, the steady-state vapor recovery line pressure during refueling may thus be indicative of the flow rate of the fuel dispenser. FIG. 3 depicts an example plot 300 indicating a linear regression between steady-state vapor recovery line pressure (in in $H_2O$) and fuel flow rate (in gal/min). Plot 300 includes plot point 305, depicting the steady-state tank pressure and fuel flow rate for the 4 gal/min fuel dispenser described with regards to FIG. 2A. Plot 300 further includes plot point 310, depicting the steady-state tank pressure and fuel flow rate for the 6 gal/min fuel dispenser described with regards to FIG. 2B, and further includes plot point 315, depicting the steady-state tank pressure and fuel flow rate for the 12 gal/min fuel dispenser described with regards to FIG. 2C. Regression line 325 represents the relationship between steady-state vapor recovery line pressure and fuel flow rate for an example fuel system. During (and/or following) a refueling event, the steady-state pressure may be determined via the vapor recovery line pressure transducer, and the pressure then used to determine the fuel flow rate via an equation or lookup table stored in the vehicle controller.

However, if there is a restriction in the vapor recovery line (e.g. one or more recovery line orifices are partially or completely blocked), the vapor recovery line pressure will be decreased. Regression line 330 shows an example relationship between steady-state vapor recovery line pressure and fuel flow rate for an example fuel system where the vapor recovery line is partially restricted. For example, at a 10 gal/min flow rate, while the unrestricted vapor recovery line pressure is ~1.0 in H₂O, the restricted vapor recovery line pressure is ~0.5 in H₂O.

If the fuel level indicator is functional, and the controller is maintained on during a refueling event (such as for hybrid vehicles where the fuel tank must be depressurized via the opening of a fuel tank isolation valve prior to releasing the fuel cap locking mechanism) restrictions in the vapor recovery line may thus be determined based on the correlation between vapor recovery line pressure and fuel flow rate, as determined by the FLI over time. While a restriction between the fuel tank and the fuel vapor canister will likely result in a premature shutoff during refueling, a restriction in the vapor recovery line may not necessarily result in a premature shutoff. Thus diagnosing a restriction may not otherwise occur during a refueling event. Further, a recovery line blockage may lead to false-passes of evaporative emissions leak tests where the fuel cap is missing, loose, or otherwise degraded.

The rate of fuel vapor canister loading is also dependent on the percent restriction of the vapor recovery line. If the vapor recovery line is completely restricted, the canister will have to adsorb more vapors, as vapor recirculation will cease. In some cases, this could result in a failing emissions test. For example, a fuel system may be configured to load the canister at a rate of 4.7 grams of hydrocarbons per gallon of dispensed fuel. If the recirculation line is designed to hold 20% of the fuel vapor generated during refueling, the same system would load the canister at a rate of 6.0 grams of fuel vapor per gallon of dispensed fuel. As shown in FIG. 3A, the percent of restriction may be determined based on the correlation between fuel flow rate and vapor recovery line pressure. A restriction percentage may also be determined based on vapor recovery line hydrocarbon concentration. The restriction percentage may then be used to determine the rate of fuel vapor canister loading. Although the fuel tank pressure sensor may also be used to infer the rate of fuel vapor canister loading, a restriction in the vapor recovery line would not be factored in to that estimate, and the canister load rate may be underestimated.

FIG. 4 shows a flow chart for an example high-level method 400 for inferring a fuel vapor canister loading rate during a refueling event. In particular, method 400 relates to inferring a fuel vapor canister loading rate based on a vapor recovery line fuel vapor circulation rate. Method 400 will be described herein with reference to the components and systems depicted in FIG. 1, though it should be understood that the method may be applied to other systems without departing from the scope of this disclosure. Method 400 may be carried out by controller 12, and may be stored as executable instructions in non-transitory memory.

Method 400 may begin at 405. At 405, method 400 may include evaluating operating conditions. Operating conditions may include, but are not limited to, fuel tank pressure, ambient temperature, engine operating status, vehicle location (as determined through an on-board GPS, for example), etc. Operating conditions may be measured by one or more sensors 16 coupled to controller 12, or may be estimated or inferred based on available data.

Continuing at 410, method 400 may include determining whether emissions control system degradation is known. Determining whether emissions control system degradation is known may include retrieving emissions control test results and/or flags, degradation indicators, etc. from the controller. Emissions control system degradation may include leaks, faulty valves, blockages, canister restrictions, etc. If emissions control system degradation is known, method 400 may proceed to 415. At 415, method 400 may include adjusting refueling and/or canister load determination strategies in accordance with the known degradation. For example, a known leakage or blockage may lead to a strategy for refueling including a fuel tank depressurization routine that comprises an alternative route for fuel vapor and/or air stripped of fuel vapor in order to avoid the site of degradation. In another example, a canister load determination strategy may increase or decrease the expected canister load rate based on the type and location of degradation. Method 400 may then end.

If there is no known emissions control system degradation, method 400 may proceed to 420. At 420, method 400 may include determining whether a refueling event has been requested. For example, hybrid vehicle 6 may comprise a refueling request button located on the vehicle dashboard. Detecting depression of the refueling request button may indicate that a refueling event is imminent. In other examples, determining whether a refueling event is imminent may include detecting proximity to a refueling station. For example, the vehicle's proximity to a refueling station may be determined via an on-board GPS or through wireless communication between the vehicle and a refueling pump. In other examples, a refueling event may be inferred by the vehicle operator (or a refueling attendant) opening a refueling door or otherwise attempting to gain access to fuel filler system 19.

If no refueling event is requested, method 400 may proceed to 425. At 425, method 400 may include maintaining the current canister load inference strategy, and may further include indicating the current canister load. Method 400 may then end.

If a refueling event is requested, method 400 may proceed to 430. At 430, method 400 may include depressurizing the fuel tank. Depressurizing the fuel tank may include opening (or maintaining open) CVV 97, closing (or maintaining closed) CPV 61, and then opening FTIV 52. However, other fuel tank depressurizing strategies may be used depending on the fuel system configuration and the current operating conditions. For example, if the fuel tank pressure is above a threshold, a step-wise or gradual depressurization strategy may be used in order to prevent corking shut of the fill-limit vent valve and grade vent valves. Depressurizing the fuel tank may result in fuel vapor being vented to fuel vapor canister 22. However, in examples where the fuel tank contains a vacuum, depressurizing the fuel tank may result in fresh air being drawn into the fuel tank via the fuel vapor canister, which may result in some fuel vapor being desorbed from the fuel vapor canister and drawn into the fuel tank. Once the fuel tank has been depressurized, the refueling lock may be unlocked, allowing access to the fuel filler neck.

Continuing at 435, method 400 may include inferring the current canister load. Inferring the current canister load may include determining the canister load prior to the fuel tank depressurization, determining the net change of canister load during the fuel tank depressurization, and summing the prior canister load and the net change. Canister load changes may be determined based on canister temperature changes, as adsorption is an exothermic reaction and desorption is an endothermic reaction. Canister load changes may be determined based on fuel tank pressure prior to and following venting of the fuel tank to the fuel vapor canister. During canister purge operations, canister load changes may be determined based on changes in A/F ratio at engine intake and/or at an exhaust oxygen sensor. Canister loading and unloading amounts may also be determined by one or more hydrocarbon sensors coupled within the emissions control system.

Once the pre-refueling canister load has been inferred, method 400 may proceed to 440. At 440, method 400 may include monitoring the fuel level indicator (FLI) and the vapor recovery line fuel vapor circulation rate throughout the refueling event. The fuel vapor circulation rate may monitored based on an output of a pressure sensor and/or hydrocarbon sensor coupled within the vapor recovery line. In some examples, the fuel tank pressure may also be monitored throughout the refueling event. Data from the fuel level indicator may be used to determine a fuel dispensation rate over time. In some examples, the fuel dispensation rate may be determined based on the fuel tank pressure, and/or may be determined through communication between the controller and the fuel dispenser (e.g., output of a wireless signal from the fuel dispenser indicating the fuel dispensation rate).

Based on the fuel dispensation rate, an expected recovery line fuel vapor circulation rate may be determined. The expected recovery line fuel vapor circulation rate may be further based on ambient and operating conditions, such as ambient temperature, bulk fuel temperature, barometric pressure, fuel composition, etc. Continuing at 445, method 400 may include determining whether the steady-state vapor recovery line fuel vapor circulation rate is equal to (and/or within a threshold of) the expected vapor recovery line fuel vapor circulation rate. As described with regard to FIG. 3, a restriction in the recovery line may lead to a decrease in the pressure seen in the vapor recovery line during the refueling event. If the realized vapor recovery line fuel vapor circulation rate is equal to the expected vapor recovery line fuel vapor circulation rate for the determined fuel dispensation rate, method 400 may proceed to 450. At 450, method 400 may include indicating the canister load based on a pre-determined canister load rate per gallon of fuel dispensed (e.g., 4.7 grams/gallon). For example, the pre-determined canister load rate may be used to determine the amount of fuel vapor adsorbed by the canister during the refueling event. This amount may then be added to the canister load inferred prior to the refueling event to determine the current canister load. Indicating the canister load may include recording the determined canister load at controller 12.

If the realized vapor recovery line fuel vapor circulation rate is equal to the expected vapor recovery line fuel vapor circulation rate for the determined fuel dispensation rate, method 400 may proceed to 455. At 455, method 400 may include indicating vapor recovery line degradation. Indicating recovery line degradation may include setting a flag at the controller, and may further include illuminating a malfunction indicator lamp (MIL). The flag set at the controller may include information regarding the percent of degradation (e.g., partially blocked, completely blocked, etc.). The indication of degradation may be accompanied by adjustments to other fuel system operations. For example, the canister purge schedule may be adjusted in order to reduce the canister load prior to a refueling event so as to increase the canister capacity in order to accommodate a greater quantity of refueling vapors.

Continuing at 460, method 400 may include adjusting the canister load rate based on the steady-state vapor recovery line fuel vapor circulation rate. For example, the canister loading rate may be determined by the following equation:

Adjusted Load Rate=Pre-Determined Load Rate+
(Restriction %)*(Maximum Load Rate−
Pre-Determined Load Rate)

For example, if the Pre-Determined Load Rate is 4.7 grams/gal, the Maximum Load Rate (assuming no circulation through the vapor recovery line) is 6.0 grams/gal (vapor recovery line holds ~20% of the refueling vapors), and the Restriction % is 50% (e.g., vapor recovery line pressure is 0.5*Expected vapor recovery line pressure), the Adjusted Load Rate would be 4.7+0.5*1.3 or 5.35 grams/gal.

Continuing at 465, method 400 may include indicating the canister load based on the adjusted canister load rate per gallon of fuel dispensed. For example, the adjusted canister load rate may be used to determine the amount of fuel vapor adsorbed by the canister during the refueling event. This amount may then be added to the pre-refueling canister load to determine the current canister load. Indicating the canister load may include recording the determined canister load at controller 12.

Once the canister load has been indicated (whether based on the pre-determined load rate or the adjusted load rate) method 400 may proceed to 470. At 470, method 400 may include sealing the fuel tank (e.g., closing the FTIV). Continuing at 475, method 400 may include adjusting emissions system operations based on the canister load. For example, the canister purge schedule and/or purging thresholds may be adjusted. In some examples, the fuel tank venting schedule and/or venting thresholds may be adjusted. In some examples, canister maintenance operations during a prolonged vehicle soak may be adjusted (e.g., canister vent valve may be commanded closed, vehicle-off canister maintenance operations may be updated, etc.). Further, emissions system leak testing schedules and/or thresholds may be adjusted based on the canister load. Other systemic operations and thresholds may be adjusted based on the increased canister load following refueling, and further based on strategies to maintain hydrocarbons within the canister and prevent bleed emissions. Method 400 may then end.

FIG. 5 depicts an example timeline 500 for a refueling event in a hybrid vehicle comprising an intact vapor recovery line, using the method described herein and with regard to FIG. 4 as applied to the system described herein and with regard to FIG. 1. Timeline 500 includes plot 510, indicating the status of a fuel tank isolation valve (FTIV) over time. Timeline 500 further includes plot 520, indicating a fuel dispensation rate over time in gallons per minute. Timeline 500 further includes plot 530, indicating a vapor recovery line pressure over time in inches of $H_2O$. Timeline 500 further includes plot 540, indicating a canister load rate over time in grams per gallon, and plot 550, indicating a total canister load over time in grams. Timeline 500 further includes plot 560 indicating whether a vapor recovery line restriction is indicated over time.

At time $t_0$, the refueling and emissions control systems are at rest. Accordingly, the FTIV is closed, as indicated by plot 510. The recovery line pressure is slightly above atmospheric pressure, as indicated by plot 530, and the canister is relatively empty (~10 g of hydrocarbons adsorbed out of an 80 g capacity). At time $t_1$, a refueling request is received (not shown). Accordingly, the FTIV is opened, depressurizing the fuel tank. The recovery line pressure decreases to atmosphere, while the total canister load increases based on the fuel vapor stored in the fuel tank, as indicated by plot 550.

At time $t_2$, the refueling event begins. The fuel dispensation rate rapidly increases, as does the vapor recovery line pressure. The canister load rate also increases, as shown by plot 540. Accordingly, the total canister load begins increasing. At time $t_3$, the steady-state portion of the refueling event is reached. The steady-state fuel dispensation rate is ~10 gal/min, and the steady-state vapor recovery line pressure is 1.0 in H$_2$O. As shown in FIG. 3, this vapor recovery line pressure is equal to the expected pressure for a 10 gal/min fuel dispensation rate for the described system. Accordingly, the canister load rate is the pre-determined rate of 4.7 g/gal. No vapor recovery line restriction is indicated, as shown by plot 560, and the total canister load increases linearly at rate of 4.7 g/gal.

At time t$_4$, the refueling event ends. The fuel dispensation rate returns to zero. The vapor recovery line pressure decreases, as fuel vapor diffuses towards the fuel vapor canister. The canister load rate decreases, and the total canister load increases at a slower rate than during the steady-state conditions. At time t$_5$, the FTIV is closed. The recovery line pressure and canister load are thus held constant.

FIG. 6 depicts an example timeline 600 for a refueling event in a hybrid vehicle comprising a restricted vapor recovery line, using the method described herein and with regard to FIG. 4 as applied to the system described herein and with regard to FIG. 1. Timeline 600 includes plot 610, indicating the status of a fuel tank isolation valve (FTIV) over time. Timeline 600 further includes plot 620, indicating a fuel dispensation rate over time in gallons per minute. Timeline 600 further includes plot 630, indicating a vapor recovery line pressure over time in inches of H$_2$O. Plot 635 indicates the vapor recovery line pressure over time for the example shown in FIG. 5 (plot 530). Timeline 600 further includes plot 640, indicating a canister load rate over time in grams per gallon. Plot 635 indicates the canister load rate over time for the example shown in FIG. 5 (plot 540). Timeline 600 further includes plot 650, indicating a total canister load over time in grams, and plot 660 indicating whether a vapor recovery line restriction is indicated over time.

At time t$_0$, the refueling and emissions control systems are at rest. Accordingly, the FTIV is closed, as indicated by plot 610. The recovery line pressure is slightly above atmospheric pressure, as indicated by plot 630, and the canister is relatively empty (~10 g of hydrocarbons adsorbed vs an 80 g capacity). At time t$_1$, a refueling request is received (not shown). Accordingly, the FTIV is opened, depressurizing the fuel tank. The recovery line pressure decreases to atmosphere, while the total canister load increases based on the fuel vapor stored in the fuel tank, as indicated by plot 650.

At time t$_2$, the refueling event begins. The fuel dispensation rate rapidly increases, as does the vapor recovery line pressure. The canister load rate also increases, as shown by plot 640. Accordingly, the total canister load begins increasing. At time t$_3$, the steady-state portion of the refueling event is reached. The steady-state fuel dispensation rate is ~10 gal/min, and the steady-state vapor recovery line pressure is 0.5 in H$_2$O. As shown by plot 635, this vapor recovery line pressure is less than the expected pressure for a 10 gal/min fuel dispensation rate for the described system (1.0 in H$_2$O). Accordingly, the canister load rate in this example is the adjusted rate of 5.35 g/gal, greater than the expected loading rate of 4.7 g/gal as indicated by plot 645. A vapor recovery line restriction is indicated, as shown by plot 560, and the total canister load increases linearly at rate of 5.35 g/gal.

At time t$_4$, the refueling event ends. The fuel dispensation rate returns to zero. The vapor recovery line pressure decreases, as fuel vapor diffuses towards the fuel vapor canister. The canister load rate decreases, and the total canister load increases at a slower rate than during the steady-state conditions. At time t$_5$, the FTIV is closed. The recovery line pressure and canister load are thus held constant.

The systems described herein and with regard to FIG. 1 along with the method described herein and with regard to FIG. 4 may enable one or more systems and one or more methods. In one example, a method is provided, comprising indicating a fuel vapor canister load based on a steady-state fuel vapor circulation rate in a vapor recovery line during a refueling event; and adjusting a canister purging operation in response to the indicated fuel vapor canister load. In such an example, the method may additionally or alternatively comprise adjusting a canister purge schedule for a fuel vapor canister based on the indicated fuel vapor canister load. In any of the preceding examples, the method may additionally or alternatively comprise indicating degradation of the vapor recovery line based on the steady-state fuel vapor circulation rate in the vapor recovery line during the refueling event. In any of the preceding examples, the method may additionally or alternatively comprise indicating a fuel vapor canister loading rate based on the steady-state fuel vapor circulation rate in the vapor recovery line during the refueling event. In some examples, the fuel vapor canister loading rate may additionally or alternatively be based on a rate of fuel dispensation during the refueling event. In some examples, the rate of fuel dispensation during the refueling event may additionally or alternatively be based on an output of a fuel level indicator over time. In any of the preceding examples where a fuel vapor canister loading rate is indicated, the fuel vapor canister loading rate may additionally or alternatively be based on a maximum fuel vapor canister loading rate, the maximum fuel vapor canister loading rate may additionally or alternatively be based on a fuel vapor canister loading rate wherein no circulation of fuel vapor through the vapor recovery line takes place during the refueling event. In any of the preceding examples, the steady-state fuel vapor circulation rate may additionally or alternatively be based at least in part on a steady-state pressure in the vapor recovery line during the refueling event. In any of the preceding examples, the steady-state fuel vapor circulation rate may additionally or alternatively be based at least in part on a steady-state output of a hydrocarbon sensor in the vapor recovery line during the refueling event. The technical result of implementing this method is that an accurate canister load may be determined following a refueling event, and canister purging operations adjusted accordingly. In this way, bleed emissions that may stem from underestimating canister load may be reduced. In other representations where a fuel vapor canister loading rate is indicated, the fuel vapor canister loading rate may additionally or alternatively be based on a volume of the vapor recovery line. In other representations, the fuel vapor canister load may additionally or alternatively be based on the fuel vapor canister load prior to the refueling event.

In another example, a fuel system for a vehicle is provided, comprising a fuel tank coupled to a fuel vapor canister, a fuel filler neck coupled to the fuel tank, a vapor recovery line coupled between the fuel tank and the fuel filler neck, a vapor recovery line fuel vapor circulation sensor coupled within the vapor recovery line, and a controller with instructions stored in non-transitory memory, that when executed cause the controller to monitor a fuel vapor circulation rate in the vapor recovery line during a refueling event, and indicate a fuel vapor canister load based on a steady-state vapor recovery line fuel vapor circulation rate during the refueling event. In such an example, a fuel level indicator may additionally or alternatively be coupled within the fuel tank, and the controller may additionally or alternatively be configured with instructions in non-transitory memory, that when executed cause the controller to indicate a rate of fuel dispensation based on an output of the fuel level indicator during the refueling event, and indicate the fuel vapor canister load based on the rate of fuel dispensation. In any of the preceding examples, the controller may additionally or alternatively be configured with instructions in non-transitory memory, that when executed cause the controller to indicate an expected vapor recovery line fuel vapor circulation rate based on the rate of fuel dispensation, and indicate degradation of the vapor recovery line responsive to the steady-state vapor recovery line fuel vapor circulation rate being less than the expected vapor recovery line fuel vapor circulation rate by more than a threshold. In any of the preceding examples wherein an expected vapor recovery line fuel vapor circulation rate is indicated, the controller may additionally or alternatively be configured with instructions in non-transitory memory, that when executed cause the controller to: responsive to the steady-state vapor recovery line fuel vapor circulation rate being within a threshold of than the expected vapor recovery line fuel vapor circulation rate, indicate the fuel vapor canister load based on an expected fuel vapor canister loading rate. In some examples, the expected fuel vapor canister loading rate may additionally or alternatively be based on a volume of the vapor recovery line. In any of the preceding examples, the vapor recovery line may additionally or alternatively be configured to hold 20% of refueling vapors within the fuel system during a steady-state portion of the refueling event. In any of the preceding examples, the maximum fuel vapor canister loading rate may additionally or alternatively be based on zero circulation of fuel vapor through the vapor recovery line takes place during the refueling event. In any of the preceding examples, the vapor recovery line fuel vapor circulation sensor may additionally or alternatively be a pressure sensor. In any of the preceding examples, the vapor recovery line fuel vapor circulation sensor may additionally or alternatively be a hydrocarbon sensor. The technical result of implementing this system is the diagnosis and quantification of a percent restriction of a vapor recovery line. In this way, downstream operations may be adjusted based on an accurate canister load following a refueling event. In other representations, the fuel vapor canister loading rate may additionally or alternatively be based on a sum of the expected fuel vapor canister loading rate and a product of the maximum fuel vapor canister loading rate and a percent restriction of the vapor recovery line. In other representations, the percent restriction of the vapor recovery line may additionally or alternatively be based on the expected vapor recovery line pressure and the steady-state vapor recovery line pressure during the refueling event.

In yet another example, method for a fuel system is provided, comprising responsive to a refueling request, opening a fuel tank isolation valve coupled between a fuel tank and a fuel vapor canister, indicating a pre-refueling canister load based on a canister load and a fuel tank pressure prior to opening the fuel tank isolation valve, monitoring a fuel level over time and a pressure in a vapor recovery line over time during a refueling event, indicating a rate of fuel vapor canister loading based on a steady-state fuel level rate of change and further based on a steady-state vapor recovery line pressure during the refueling event, indicating an updated canister load based on the pre-refueling canister load and the rate of fuel vapor canister loading during the refueling event, and updating a canister purge schedule based on the updated canister load. In such an example, the method may additionally or alternatively comprise indicating an expected vapor recovery line pressure based on the steady-state fuel level rate of change during the refueling event, indicating degradation of the vapor recovery line responsive to the steady-state vapor recovery line pressure during the refueling event being less than the expected vapor recovery line pressure by more than a threshold, adjusting the rate of fuel vapor canister loading based on the indicated degradation of the vapor recovery line, and indicating the updated canister load based on the adjusted rate of fuel vapor canister loading. The technical result of implementing this method is a reduction in bleed emissions, as the canister loading status may otherwise be underestimated based on an expected canister loading rate that does not take vapor recovery line degradation into account.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
indicating a fuel vapor canister load based on a steady-state fuel vapor circulation rate in a vapor recovery line during a refueling event; and
adjusting a canister purging operation in response to the indicated fuel vapor canister load.

2. The method of claim 1, further comprising:
adjusting a canister purge schedule for a fuel vapor canister based on the indicated fuel vapor canister load.

3. The method of claim 1, further comprising:
indicating degradation of the vapor recovery line based on the steady-state fuel vapor circulation rate in the vapor recovery line during the refueling event.

4. The method of claim 1, further comprising:
indicating a fuel vapor canister loading rate based on the steady-state fuel vapor circulation rate in the vapor recovery line during the refueling event.

5. The method of claim 4, wherein the fuel vapor canister loading rate is further based on a rate of fuel dispensation during the refueling event.

6. The method of claim 5, wherein the rate of fuel dispensation during the refueling event is based on an output of a fuel level indicator over time.

7. The method of claim 4, wherein the fuel vapor canister loading rate is based on a maximum fuel vapor canister loading rate, the maximum fuel vapor canister loading rate based on a fuel vapor canister loading rate wherein no circulation of fuel vapor through the vapor recovery line takes place during the refueling event.

8. The method of claim 1, wherein the steady-state fuel vapor circulation rate is based at least in part on a steady-state pressure in the vapor recovery line during the refueling event.

9. The method of claim 1, wherein the steady-state fuel vapor circulation rate is based at least in part on a steady-state output of a hydrocarbon sensor in the vapor recovery line during the refueling event.

10. A fuel system for a vehicle, comprising:
a fuel tank coupled to a fuel vapor canister;
a fuel filler neck coupled to the fuel tank;
a vapor recovery line coupled between the fuel tank and the fuel filler neck;
a vapor recovery line fuel vapor circulation sensor coupled within the vapor recovery line; and
a controller with instructions stored in non-transitory memory, that when executed cause the controller to:
monitor a fuel vapor circulation rate in the vapor recovery line during a refueling event; and
indicate a fuel vapor canister load based on a steady-state vapor recovery line fuel vapor circulation rate during the refueling event.

11. The fuel system of claim 10, further comprising:
a fuel level indicator coupled within the fuel tank;
wherein the controller is further configured with instructions in non-transitory memory, that when executed cause the controller to:
indicate a rate of fuel dispensation based on an output of the fuel level indicator during the refueling event; and
indicate the fuel vapor canister load based on the rate of fuel dispensation.

12. The fuel system of claim 11, wherein the controller is further configured with instructions in non-transitory memory, that when executed cause the controller to:
indicate an expected vapor recovery line fuel vapor circulation rate based on the rate of fuel dispensation; and
indicate degradation of the vapor recovery line responsive to the steady-state vapor recovery line fuel vapor circulation rate being less than the expected vapor recovery line fuel vapor circulation rate by more than a threshold.

13. The fuel system of claim 12, wherein the controller is further configured with instructions in non-transitory memory, that when executed cause the controller to:
responsive to the steady-state vapor recovery line fuel vapor circulation rate being within a threshold of than the expected vapor recovery line fuel vapor circulation rate, indicate the fuel vapor canister load based on an expected fuel vapor canister loading rate.

14. The fuel system of claim 13, wherein the expected fuel vapor canister loading rate is based on a volume of the vapor recovery line.

15. The fuel system of claim 14, wherein the vapor recovery line is configured to hold 20% of refueling vapors within the fuel system during a steady-state portion of the refueling event.

16. The fuel system of claim 14, wherein a maximum fuel vapor canister loading rate is based on zero circulation of fuel vapor through the vapor recovery line taking place during the refueling event.

17. The fuel system of claim 10, wherein the vapor recovery line fuel vapor circulation sensor is a pressure sensor.

18. The fuel system of claim 10, wherein the vapor recovery line fuel vapor circulation sensor is a hydrocarbon sensor.

19. A method for a fuel system, comprising:
responsive to a refueling request, opening a fuel tank isolation valve coupled between a fuel tank and a fuel vapor canister;
indicating a pre-refueling canister load based on a canister load and a fuel tank pressure prior to opening the fuel tank isolation valve;
monitoring a fuel level over time and a pressure in a vapor recovery line over time during a refueling event;
indicating a rate of fuel vapor canister loading based on a steady-state fuel level rate of change and further based on a steady-state fuel vapor circulation rate during the refueling event;
indicating an updated canister load based on the pre-refueling canister load and the rate of fuel vapor canister loading during the refueling event; and
updating a canister purge schedule based on the updated canister load.

20. The method of claim 19, further comprising:
indicating an expected recovery line fuel vapor circulation rate based on the steady-state fuel level rate of change during the refueling event;
indicating degradation of the vapor recovery line responsive to the steady-state fuel vapor circulation rate during the refueling event being less than the expected recovery line fuel vapor circulation rate by more than a threshold;
adjusting the rate of fuel vapor canister loading based on the indicated degradation of the vapor recovery line; and
indicating the updated canister load based on the adjusted rate of fuel vapor canister loading.

* * * * *